Aug. 1, 1939.    H. ROLLMANN    2,168,243
METHOD FOR THE PRODUCTION OF SHOES
Filed March 23, 1934    4 Sheets—Sheet 1
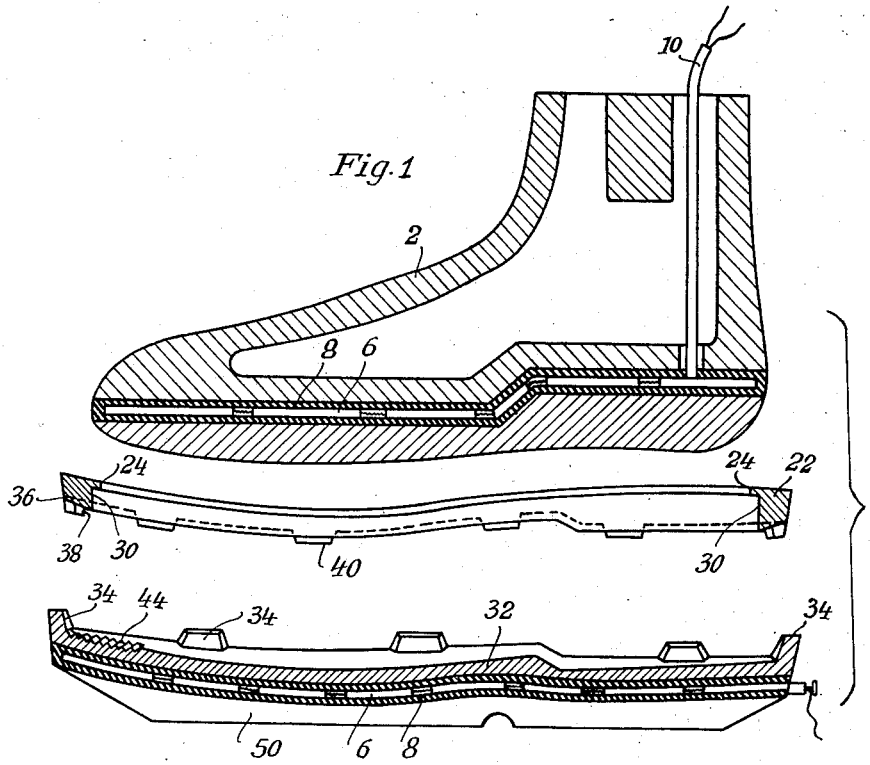
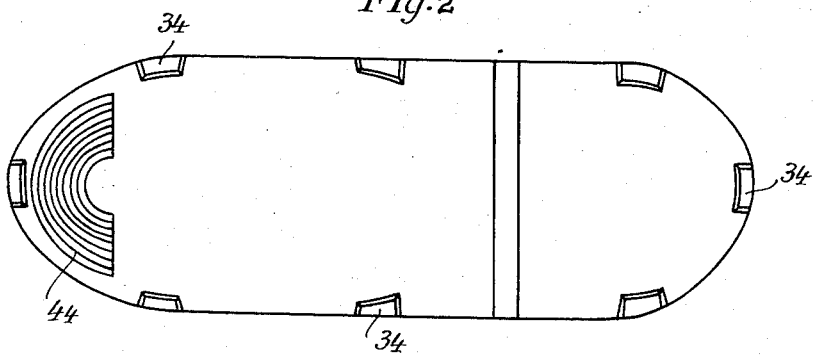
Inventor
Hans Rollmann
By A. A. Wicke
Attorney Aug. 1, 1939. H. ROLLMANN 2,168,243
METHOD FOR THE PRODUCTION OF SHOES
Filed March 23, 1934 4 Sheets-Sheet 2
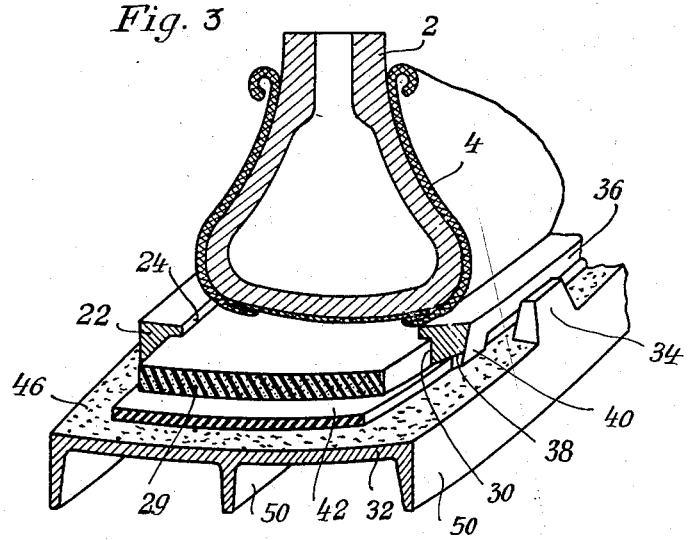
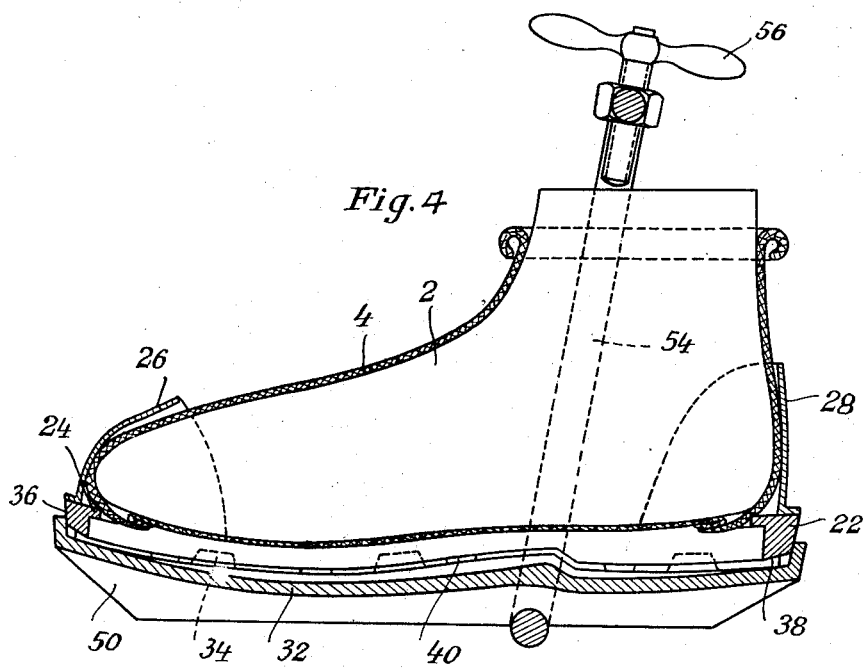
Inventor
Hans Rollmann
By A. A. Wicks
Attorney Aug. 1, 1939.  H. ROLLMANN  2,168,243
METHOD FOR THE PRODUCTION OF SHOES
Filed March 23, 1934    4 Sheets-Sheet 4

Inventor
Hans Rollmann
By A. A. Uihe
Attorney

Patented Aug. 1, 1939

2,168,243

UNITED STATES PATENT OFFICE 2,168,243

METHOD FOR THE PRODUCTION OF SHOES

Hans Rollmann, Koeln-Marienburg, Germany, assignor, by mesne assignments, to Ludwig H. Grunebaum, New York, N. Y.

Application March 23, 1934, Serial No. 717,029
In Germany March 9, 1932

4 Claims. (Cl. 18—59)

My invention relates to method for the production of shoes and particularly to the production of footwear such as boots, shoes, slippers and the like having soles formed in whole or in part of rubber which is of a porous nature, such as sponge rubber, and this application is a continuation in part of my U. S. application Ser. No. 684,295, filed August 9, 1933 (Patent No. 1,955,720, April 17, 1934).

One of the objects of my invention is to provide novel methods for producing boots, shoes, slippers, and similar articles, having soles formed in whole, or in part of porous rubber.

Another object of my invention is to provide an improved and inexpensive method of securing sponge rubber to an upper and/or to a tread of a shoe or the like.

A further object of my invention is to provide a method for producing boots, shoes, slippers and the like, having soles formed in whole, or in part, of porous rubber in which the bond between the rubber and another element of the shoe is produced by expansion of the rubber while in pressure contact with said element.

Another object of my invention is to produce a firm bond between rubber and the upper or tread of a shoe, by vulcanization of the rubber in contact with the upper or tread and while under pressure created by expansion of the rubber itself or by constituents thereof during the vulcanization operation. These and other objects and features of my invention will appear from the following description thereof in which reference is made to the accompanying drawings illustrating forms of mechanism which may be employed in the practice of my invention.

Fig. 1 shows in longitudinal cross-section a last adapted to be heated by electricity, a mold ring therefor, and a base plate, the latter being also adapted for heating by electricity;

Fig. 2 is a plan view of the base plate;

Fig. 3 is a perspective view, partly in section, of the vulcanization form assembly;

Fig. 4 illustrates a modification of the vulcanization form;

Fig. 7 illustrates a work bench provided with a plurality of vulcanization forms and connections for heating said forms by steam or the like;

Figure 5:
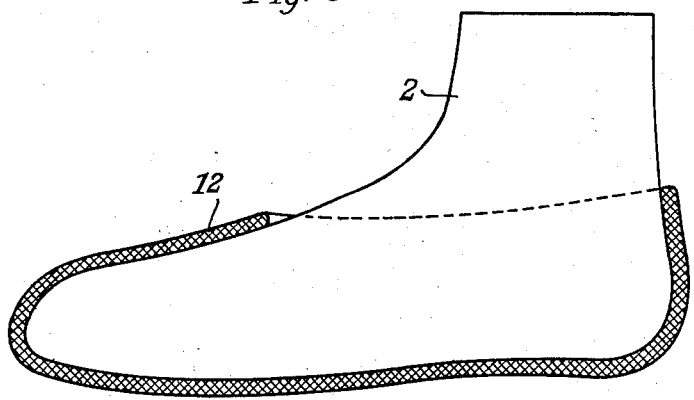
Fig. 5 shows a padded last made in accordance with one form of the invention.

The apparatus shown by way of illustration in Figs. 1 to 9 of the drawings comprises a last 2 upon which the upper 4 of the shoe or other article to be produced may be placed. The last may be formed of wood, metal or any other suitable material and given any desired shape for producing the type of boots, shoes or the like desired. As shown in Fig. 1, the last is provided in the lower portion thereof with an electric heating element 6 insulated from the last by asbestos or other suitable material 8 and connected to a source of current by conductors 10. However, it will be apparent that the last may be heated by any suitable means or method for vulcanization of the rubber sole.

As shown in Fig. 5 a resilient or yieldable cover 12 may be applied over the last and beneath the upper to present a rubber-tight and continuous line of contact between the upper and the mold used in forming the sole of the shoe so that the rubber of which the sole is made will not be extruded between the mold and upper when it expands and develops pressure during vulcanization. The cover 12 may be made of rubber, cloth, or other suitable material and is of particular value in applying soles to uppers formed of relatively stiff or heavy materials such as leather or the like which do not readily conform to the shape of the mold, or with materials which are easily cut or bruised. The cover may be easily applied and removed from the last so that in the event the elasticity or resilience of the cover is lost during repeated operations or long continued use it may be replaced by a new cover having the desired degree of resilience.

Figure 6:
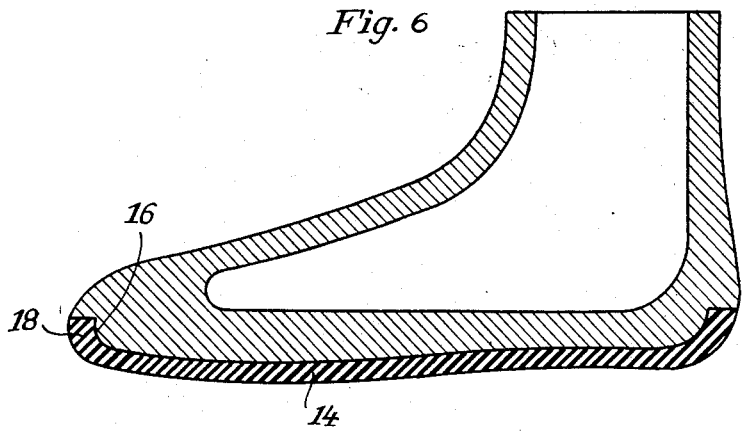
Fig. 6 shows a modified form of padded last.

In Fig. 6 a yieldable insert 14 is carried by the last and extends throughout that portion thereof which cooperates with the sole mold to obtain a good rubber-tight seal. The last may be recessed at 16 to receive the insert and the insert may be formed with corresponding portions 18 extending into the recess 16 to hold the same in position while permitting ready removal and replacement thereof.

Figure 8:
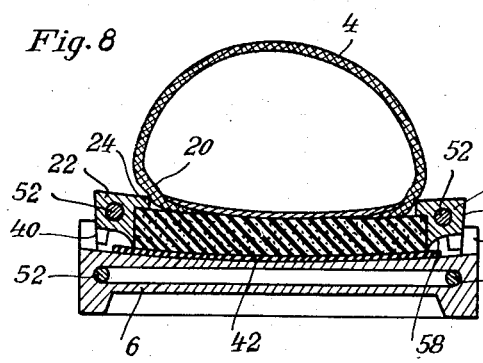
Fig. 8 is a view somewhat similar to Fig. 3, illustrating certain modifications including means for automatically trimming the tread sole edges as an incident to the vulcanization of the sponge rubber.

In the alternative the last may be somewhat flattened about that portion thereof which cooperates with the mold as shown at 20 in Fig. 8 whereby positioning of the parts will insure the formation of a rubber-tight seal between the upper on the last and the sole mold when the parts are in place for vulcanization of the rubber. It will be understood, of course, that the escape of air and gases from the mold and rubber may take place through the fibers of the upper or elsewhere without permitting escape of the rubber.

The mold may take any suitable form and, as shown in Fig. 1, the mold comprises a sole edge forming member 22 in the form of a continuous ring extending about the last and formed to engage the upper as shown in Figs. 3, 4, and 8. For this purpose the mold is provided with an upper inturned lip or flange 24 which presents a smooth continuous edge against which the last with the upper thereon engages. The inwardly sloping lower surface of the last serves to position the last with respect to the mold to some extent, but I prefer to provide the mold with suitable guiding or positioning means such as the toe guide 26 and the heel guide 28 shown in the construction illustrated in Fig. 4. This arrangement permits the last and mold to be quickly and easily assembled so that the upper will be accurately positioned with respect to the shoe sole in every case without special care on the part of the operator. At the same time the pressure of the yieldable means 12 or 14 or the bevelled portion 20 of the last brings the parts into intimate contact so that on the subsequent expansion of the sole forming rubber 29 there are no apertures or openings through which rubber can escape or pass out into contact with the upper.

The lower portion of the mold ring 22 is formed with an under-cut portion 30 beneath the flange 24 into which the sole forming rubber may expand to form a sole projecting beyond the point of contact with the upper as in the usual form of shoe construction.

The lower face of the mold is closed by means of a suitable base plate or sole plate 32 shown in Figs. 1 to 5. The base plate is preferably provided with upstanding marginal lugs 34 presenting inclined inner faces adapted to be engaged by the inclined outer face 36 of the mold 22. These faces are accurately formed to position the base plate with respect to the mold ring 22 so that when assembled the last and base plate are always arranged in the same relative positions with respect to the mold. Products formed with the construction described will therefore be uniform in size, shape and appearance insofar as the arrangement and form of the sole is concerned, although the upper and sole may be made of materials of widely differing composition and color while using the same shoe forming elements.

When the shoe or other article is formed with a lower tread forming surface of relatively tough or dense material, as is frequently the case, the lower inner edge 38 of the mold is preferably formed to present an acute angle in cross section so that upon positioning the parts as shown in Figs. 3 and 4 the tread forming material will be forcibly engaged by the mold to prevent the escape of rubber of the intermediate sole when the rubber expands during vulcanization. As shown the mold 22 may be formed with relatively short downwardly extending projections 40 which serve to position the tread forming material 42 and to space the mold and base plate sufficiently to receive and accommodate the tread forming material without causing the same to be depressed to an undesirable extent adjacent the inner edges of the mold when the parts are clamped together. The amount of compression of the tread rubber extension will therefore always be the same irrespective of the amount of pressure applied to the clamping device. The projections 40 also prevent the base plate from being pressed unevenly against the tread forming material due to any inaccurate or careless assembly of the parts. The lugs 40 further serve as tread rubber locating means.

The form and shape of the base plate may, of course, be varied as desired. As shown in Fig. 2 the portion of the plate adjacent the toe is provided with a depressed and roughened area 44 serving to give the sole a thickened and roughened toe portion. Similarly, as shown in Fig. 3, the upper face of the base plate is formed with a mottled or roughened surface 46 to give the sole a suitably uneven or non-skid wearing face. In the same way trade-marks or other designs may be impressed on the sole during the sole forming operation without previous marking or careful positioning of the material.

The lower face of the base plate preferably is reinforced by downwardly projecting fins 50 which also serve to conduct heat to the sole forming material during the vulcanization thereof with steam or external heat.

As shown in Fig. 8 the mold 22 as well as the base plate 32 may be heated electrically by means of electrical heating elements 52 carried by or embedded in the mold and base plate themselves. This arrangement permits the application of heat in a predetermined and regulated manner to apply the greatest heat where needed. However, the last, mold, and base plate may be heated by steam, in an oven or by any other suitable manner desired.

When the upper has been applied to the last and the rubber composition used in forming the sole has been placed in the mold, together with the tread forming material, when used, the parts are clamped together and held in position by means of suitable clamping means bearing against the last and base plate and provided with a tightening device such as the wing nut 56. The construction thus provides an enclosed space between the last and base plate, or between the upper on the last and the tread forming material on the base plate within which the rubber of the intermediate sole is confined during vulcanization.

In the construction described above, the tread forming material extends beyond the edges of the mold and between the lower inclined face of the mold and the base plate. Shoes, slippers and the like formed in this way have a projecting edge of the tread forming material about the sole which must later be trimmed off or cut away by hand. The construction shown in Fig. 8 accomplishes this trimming or cutting operation automatically during the vulcanization operation and without manipulation by the operator so that the resulting product is removed from the mold in finished form. For this purpose the lower inner edge of the mold is formed at 58 with a sharp acute angle which serves as a knife edge. The pressure developed by the clamping means 54, 56 is transmitted to the cutting edge which under the heat developed during vulcanization trims off the outwardly extending edge of the tread forming material. If desired and particularly when leather or similar tread material is used which does not weaken or soften very much under heat the wing nut 56 after vulcanization has been completed is turned down sufficiently to cut or sever the outwardly extending material or so weaken it that the surplus material may be readily removed, thus insuring uniformly finished articles. In order to assure an adequate temperature at the cutting point it may be desirable to provide a local supply of heat such as the heating elements 52 in the mold ring 22 and/or the sole plate 6.

In using the apparatus shown in Figs. 1 to 8 an upper formed of any suitable material such as canvas, fabric, camel's hair, leather or the like is applied over the last in position for forming the shoe. The material of which the tread is to be formed is placed on the base plate and the mold ring is applied to the base plate in accurate location, which is facilitated by the guide means on the mold and base plate. The material of which the intermediate sole is to be formed is then placed in the mold and the last with the upper thereon is positioned with respect to the mold by slipping the toe of the last into the guide 26 and pressing the heel of the last down into position against the guide 28.

In a similar way the parts may be assembled with the last inverted. After the upper has been applied to the inverted last the mold is positioned on the upper by means of the toe and heel guides. The rubber composition for forming the intermediate sole is then introduced into the mold and the tread forming material is laid over the rubber composition and the mold, extending outward about the edges of the mold. The base plate is then placed over the tread forming material and positioned by the cooperating guides on the mold and base.

When the parts have been thus assembled the bail 54 or other securing and tightening means is applied and the wing nut 56 turned to force the three parts, namely, the last, the mold, and the base plate, together. In tightening the parts the cover 12 or the yielding material 14 carried by the last permits the upper to be depressed slightly so that a tight seal is provided between the mold and the upper, without excessive local pressure. Similarly the acute angle edge 30 of the mold shown in Figs. 1 and 3 is brought closely against the tread forming material providing a tight seal about the bottom of the mold so that the rubber cannot escape from the mold when expanded during vulcanization. When the construction of the mold shown in Fig. 8 is used the cutting edge 58 of the mold bears forcibly against the tread forming material and may even start to cut into the same.

With the parts assembled as described the last, mold, and plate are heated in any suitable manner. This may be done by turning on the current, if electric heating is employed or by applying heat in an oven or through internal heating of the parts with steam or hot water, as desired.

The rubber of which the intermediate sole is formed is preferably unvulcanized or only partially vulcanized and compounded with a suitable expanding agent so that on the application of heat to vulcanize the rubber, the rubber is expanded and becomes porous. Any suitable amount of internal pressure can thus be developed by control of the amount and character of the expanding agent use, the temperature or time of operation, or other factors so as to cause the rubber of the intermediate sole to be forced under pressure generated by expansion of the rubber during the vulcanization operation, into intimate contact with the upper and tread. The rubber thus fills the mold and enters the pores and interstices of the upper and the tread forming, upon vulcanization, a firm and intimate bond between the parts.

When vulcanization of the rubber is complete the parts may be separated by loosening the wing nut 56 and stripping off the mold from the sole. If the mold used has the form shown in Fig. 8 cutting or trimming of the edge of the tread is effected during vulcanization due to the softening of the tread forming material and/or the pressure upon said cutting edge, or by increasing the clamping pressure after vulcanization. When this trimming method is used the lugs 40 may be omitted or as shown in Fig. 8, made so short as not to interfere with such trimming action. Similarly the markings or impressions on the base plate are applied to the lower face of the tread. If the mold of Figs. 1 and 3 is used, the shoe, when removed from the mold need only to have the projecting portion of the tread trimmed off to produce a finished article.

Figure 7:
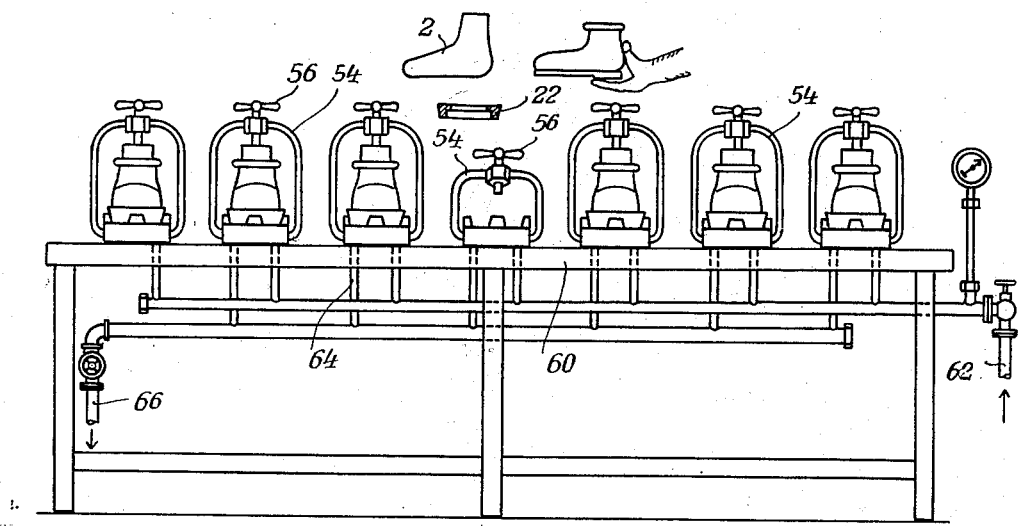

In carrying out the operation described above I have found it desirable to arrange a number of lasts on a bench or support for operation by a single operator. As shown in Fig. 7 the operator handles seven shoe forming assemblies mounted on a bench 60. Steam for vulcanizing the shoes is supplied from a common source through supply line 62 and condensate is drawn off through pipes 64 to the drain 66. The vulcanizing time required in a typical case will be about twenty-one minutes. Thus the operator is allowed three minutes in which to remove a finished shoe, assemble the elements for a new shoe and place the parts in position, and tighten the wing nut before passing on to the next shoe. The manufacture may therefore, be carried out in a continuous manner without interruption and with the employment of unskilled labor.

Figure 9:
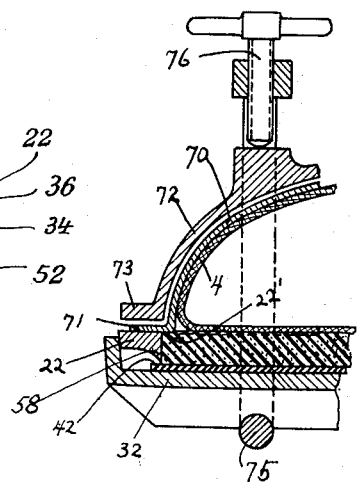
Fig. 9 is a partial longitudinal cross-sectional view illustrating a modified form of apparatus showing how a toe cap may be applied to the upper and the intermediate sole in the same operation in which the intermediate sole is formed and attached to the upper.

Fig. 9 illustrates a modified form of apparatus useful in the application of a toe cap simultaneously with the forming of the intermediate sole and its attachment to the upper and tread sole. In this form of the apparatus it will be noted that the numeral 32 designates the sole plate of the apparatus upon which the tread sole 42, preferably made of crepe rubber or the like, has been laid in the manner described above. Thereafter the mold ring 22 is placed thereon. This ring may be identical with the ring 22 described above preferably with the difference, however, that it is provided with a cut-out 22' which extends as far as the toe cap. This cut-out may be provided by merely omitting the inwardly extending flange 24 at the toe portion of the mold ring. After inserting the rubber mass, which is to form the sponge rubber intermediate sole 30, the upper 4 is placed in position. Thereafter a small rubber patch 70, which is to form the toe cap, is laid in position upon the toe portion of the upper 4. This rubber patch may be somewhat prevulcanized and, if desired, may be located in position by the use of rubber cement. It will be noted that on account of the cut-out 22' the rubber patch is to some extent exposed to the interior of the mold so that the intermediate sole material, when expanded by heat, will contact with and be firmly vulcanized to that portion of the toe cap. As shown the toe cap forming patch is provided with an outwardly extending flange portion 71 which overlies the upper edge of the mold ring. 72 designates a toe cap forming mold preferably provided with a flange portion 73 overlying the outwardly extending portion 71 of the toe cap forming patch. A bail clamp 75 may be provided for the purpose of applying any desired amount of pressure by tightening the clamping screw 76. During vulcanization the sponge rubber expands until it completely fills the mold and thereby forms the intermediate sole 30 which is simultaneously vulcanized to the tread sole 42, if used, the upper 4, and the edge of the toe cap 70. In the same operation the toe cap is vulcanized and/or cemented to the upper 4. After the vulcanization is completed the projecting edge 42 of the tread sole may be removed by the use of the sharp edge 58 of the mold ring, or by any other suitable means. That portion of the toe cap material which extends beyond the intermediate sole is trimmed off by hand or by any suitable apparatus.

While I have illustrated and described several forms of apparatus elements that may be used in practicing my invention and have described a preferred method of operation it will be apparent that numerous changes and modifications may be made in the construction and arrangement of the parts and in the manner of using the same without departing from the spirit and scope of my invention.

What is claimed is:

1. The method of forming a shoe which comprises applying an upper to a last, placing a mold for an intermediate sole against the upper, introducing unvulcanized rubber composition which during vulcanization expands and becomes porous into said mold, placing toe cap forming material upon said upper and in communication with the interior of said mold, placing a toe cap mold over said material and vulcanizing said rubber onto said upper and toe cap forming material under pressure created by expansion of the rubber during vulcanization.

2. The method of forming a shoe which comprises applying an upper to a last, placing a mold for an intermediate sole against the upper, introducing unvulcanized rubber composition which during vulcanization expands and becomes porous into said mold, placing toe cap forming material upon said upper and in communication with the interior of said mold, placing a toe cap mold over said material and vulcanizing said rubber onto said upper and toe cap forming material under pressure created by expansion of the rubber during vulcanization and trimming off any excess of toe cap forming material.

3. The method of forming a shoe which comprises placing in a sole mold an unvulcanized rubber composition containing an agent which during vulcanization serves to expand the same and render it porous, placing an upper upon a last, placing said lasted upper in position adjacent said mold, placing reinforcing material in contact with said lasted upper and said mold and in communication with the interior of said mold, and expanding and vulcanizing said composition so that it becomes securely bonded to said reinforcing material and upper.

4. The method of forming a shoe which comprises placing in a sole mold an unvulcanized rubber composition containing an agent which during vulcanization serves to expand the same and render it porous, placing an upper upon a last, placing said lasted upper in position adjacent said mold, placing reinforcing material in contact with the toe of said lasted upper and in communication with the interior of said mold, and expanding and vulcanizing said composition so that it becomes securely bonded to said reinforcing material and upper.

HANS ROLLMANN.